(12) United States Patent
Ouellette

(10) Patent No.: US 9,791,886 B2
(45) Date of Patent: Oct. 17, 2017

(54) CONTROLLER

(75) Inventor: Benoit Ouellette, Verdun (CA)

(73) Assignee: BOMBARDIER INC., Dorval, Quebec (CA)

( * ) Notice: Subject to any disclaimer, the term of this patent is extended or adjusted under 35 U.S.C. 154(b) by 190 days.

(21) Appl. No.: 14/116,383

(22) PCT Filed: May 12, 2011

(86) PCT No.: PCT/US2011/036269
§ 371 (c)(1),
(2), (4) Date: Nov. 8, 2013

(87) PCT Pub. No.: WO2012/154188
PCT Pub. Date: Nov. 15, 2012

(65) Prior Publication Data
US 2014/0091181 A1  Apr. 3, 2014

(51) Int. Cl.
*G05G 13/00* (2006.01)
*G05G 9/047* (2006.01)
(Continued)

(52) U.S. Cl.
CPC ............. *G05G 13/00* (2013.01); *B64C 13/08* (2013.01); *G05G 9/047* (2013.01); *G06F 3/0338* (2013.01)

(58) Field of Classification Search
CPC .......... G05G 2009/04774; G05G 2009/04766; G05G 2009/04777; G06F 3/0338; B64C 13/04; B64C 13/08; B64C 2201/146
See application file for complete search history.

(56) References Cited

U.S. PATENT DOCUMENTS 2,787,746 A * 4/1957 Redmond ...................... 318/580
3,007,258 A * 11/1961 Hemstreet et al. ............. 434/45
(Continued)

FOREIGN PATENT DOCUMENTS

CN         1776560 A       5/2006
CN       101349929 A       1/2009
(Continued)

OTHER PUBLICATIONS

Cessna Aircraft Company, Dec. 20, 2007, https://www.redskyventures.org/doc/cessna-poh/Cessna_206_C206H-TC_T206H_2007_NavIII-G1000+GFC700-POH-PIM-fromCessna.pdf, p. 7-88.*
(Continued)

*Primary Examiner* — Brian M O'Hara
*Assistant Examiner* — Christopher Hutchens
(74) *Attorney, Agent, or Firm* — Karceski IP Law, PLLC

(57) ABSTRACT

A controller includes a first body portion, adapted to be grasped by a person's middle finger, ring finger, and pinky finger, a second body portion adapted to be grasped by a person's index finger, and a third body portion that defines a first surface adapted to receive a person's thumb. A finger switch is positioned on a front surface of the second body portion. The finger switch is positioned such that it may be actuated by the person's index finger. The second body portion is disposed between the first body portion and the third body portion. The second body portion defines an offset with respect to the first body portion. The third body portion defines a second surface above the finger switch, which may receive the person's index finger.

14 Claims, 9 Drawing Sheets

(51) Int. Cl.
  *G06F 3/0338*  (2013.01)
  *B64C 13/08*  (2006.01)

(56) References Cited

U.S. PATENT DOCUMENTS

| | | | |
|---|---|---|---|
| 3,142,227 A | 7/1964 | Stringer | |
| 4,012,014 A | 3/1977 | Marshall | |
| 4,491,325 A | 1/1985 | Bersheim | |
| 4,688,443 A | 8/1987 | Fabre et al. | |
| 4,717,098 A * | 1/1988 | Walker et al. | 244/223 |
| 4,861,269 A | 8/1989 | Meenen, Jr. | |
| 4,895,039 A | 1/1990 | Hegg | |
| 4,907,970 A | 3/1990 | Meenen, Jr. | |
| 4,947,701 A | 8/1990 | Hegg | |
| 5,012,423 A | 4/1991 | Osder | |
| 5,071,383 A * | 12/1991 | Kinoshita | A63H 27/10 244/26 |
| 5,137,234 A | 8/1992 | Sakurai | |
| 5,264,768 A | 11/1993 | Gregory et al. | |
| 5,456,428 A * | 10/1995 | Hegg | 244/229 |
| 5,523,949 A * | 6/1996 | Agate et al. | 701/17 |
| 5,694,014 A | 12/1997 | Hegg et al. | |
| 5,735,490 A | 4/1998 | Berthet et al. | |
| 6,354,023 B1 | 3/2002 | Trahan et al. | |
| 6,572,055 B1 | 6/2003 | Bernard | |
| 6,885,917 B2 | 4/2005 | Osder et al. | |
| 6,986,249 B2 | 1/2006 | Bernard | |
| 7,219,861 B1 * | 5/2007 | Barr | A63H 27/02 244/190 |
| 7,334,658 B2 * | 2/2008 | Berg | B62D 1/12 180/333 |
| 7,630,798 B2 | 12/2009 | Mossman et al. | |
| D613,232 S | 4/2010 | Guering | |
| D613,668 S | 4/2010 | Guering | |
| 7,890,222 B1 * | 2/2011 | Shultz et al. | 701/3 |
| 2003/0037985 A1 * | 2/2003 | Jeppe et al. | 180/333 |
| 2003/0094536 A1 | 5/2003 | LaBiche | |
| 2004/0159100 A1 | 8/2004 | Bernard | |
| 2005/0068295 A1 * | 3/2005 | Schottler et al. | 345/161 |
| 2005/0080495 A1 | 4/2005 | Tessier et al. | |
| 2008/0011905 A1 | 1/2008 | Guering | |
| 2009/0178503 A1 * | 7/2009 | Hanlon et al. | 74/471 XY |
| 2009/0187292 A1 * | 7/2009 | Hreha et al. | 701/4 |
| 2011/0048162 A1 | 3/2011 | Miura et al. | |
| 2011/0066305 A1 | 3/2011 | Lin et al. | |
| 2011/0269412 A1 * | 11/2011 | Bergeron | H04B 1/385 455/78 |

FOREIGN PATENT DOCUMENTS

| | | | |
|---|---|---|---|
| EP | 1353257 A1 * | 10/2003 | G05G 9/047 |
| WO | WO 00/36250 | 6/2000 | |
| WO | WO 2009048364 A1 | 4/2009 | |

OTHER PUBLICATIONS

International Search report and Written Opinion mailed Jan. 24, 2012 in International Patent Application No. PCT/US2011/036269.
Don Witt, "Introducing Full FBW for Business AV," Professional Pilot, Sep. 2004, pp. 94-97.
Jon Ostrower, "Embraer Charts Hybrid Course for Fly-by-Wire Philosophy," FlightBlogger, Feb. 1, 2011, www.flightglobal.com.
James Tomayko, "Computers Take Flight: A History of NASA's Pioneering Digital Fly-by-Wire Project," NASA, 2000.
Airbus A319/A320/A321 Flightdeck and Systems Briefing for Pilots, Issue Sep. 1998.
"Hands-On Throttle and Stick," printed from Falconpedia on Apr. 20, 2011, http://falcon4.wikidot.com/avionics:hotas.
International Preliminary Report on Patentability mailed Nov. 12, 2013, for International Patent Application No. PCT/US2011/036269.
Chinese Office Action dated Feb. 4, 2015, for Chinese Patent Application No. 201180070802.4.
Chinese Office Action dated Oct. 19, 2015, for Chinese Patent Application No. 201180070802.4.
Chinese Office Action dated May 9, 2016, for Chinese Office Action 201180070802.4.
Jerome Meriweather, "A320 SideStick & Nosewheel Steering Tillers," http://www.meriweather.com/320/deck/stick.html, printed Apr. 20, 2011.
Chinese Office Action dated Jan. 23, 2017, for Chinese Patent Application No. 201180070802.4.

* cited by examiner

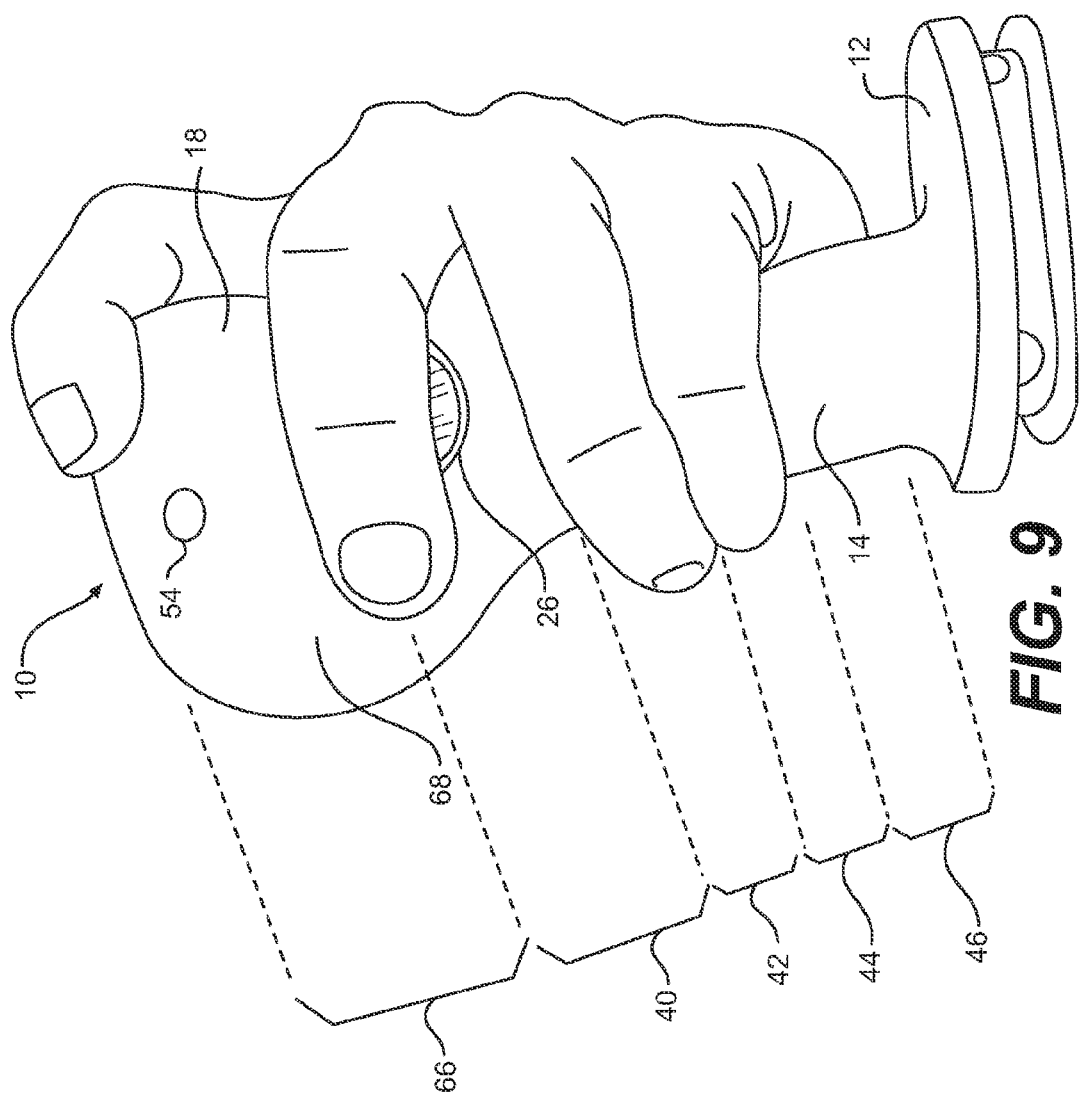

CONTROLLER

CROSS-REFERENCE TO RELATED APPLICATION(S)

This is a National Stage Entry into the United States Patent and Trademark Office from International PCT Patent Application No. PCT/US2011/036269, having an international filing date of May 12, 2011, the entire content of which is incorporated herein by reference.

FIELD OF THE INVENTION

The present invention concerns a construction for a controller for a vehicle. More specifically, the present invention is directed to the construction for a sidestick that permits control of an aircraft that incorporates, at least in part, fly-by-wire controls and associated technology.

DESCRIPTION OF THE RELATED ART

In the prior art, there are a few references that discuss the construction of a stick-type controller for an aircraft.

For example, U.S. Patent Application Publication No. 2008/0011905 (hereinafter "the '905 Application") describes a flight command system for an aircraft. The system includes a sidestick controller 2 that includes a push-to-talk lever 14 and a reset control button 16. (The '905 Application at paragraph [0018].) The system also includes a brake lever 22 that actuates the brakes on the aircraft. (The '905 Application at paragraph [0021].)

U.S. Pat. No. 4,895,039 (hereinafter "the '039 Patent") describes a hand controller 10 with a hand grip 12. (The '039 Patent at col. 3, line 68, through col. 4, line 5.) The '039 Patent, however, provides little with respect to the construction of the controller 10 and the switches disposed thereon.

U.S. Pat. No. 4,012,014 (hereinafter "the '014 Patent") describes a controller 10 for a fly-by-wire aircraft with a button B on the head 24 of the controller 10 so that a person can control the button B with his or her thumb. (The '014 Patent at col. 2, lines 46-50.) The controller 10 also includes a trigger switch T at a forward position that is actuated by depressing the trigger switch T. (The '014 Patent at col. 5, lines 29-39.)

U.S. Design Pat. Nos. Des. 613,668 and Des. 613,232 illustrate aspects of a control stick for an aircraft. The designs appear to be consistent with the controller described in the '905 Application.

One deficiency with the prior art lies in the potential for inadvertent actuation of the trigger switch on a sidestick controller when the pilot or copilot applies a high load (or force) to the sidestick controller.

Other deficiencies of the prior art should be apparent to those skilled in the art, including ease of access of the functions controlled thereby, among others.

SUMMARY OF THE INVENTION

The present invention addresses one or more deficiencies in the prior art.

Among other features, the present invention provides a controller that includes a first body portion, adapted to be grasped by a person's middle finger, ring finger, and pinky finger. A second body portion is adapted to be grasped by a person's index finger. A third body portion defines a first surface adapted to receive a person's thumb. A finger switch is positioned on a front surface of the second body portion. The finger switch is positioned so as to be actuated by the person's index finger. The second body portion is disposed between the first body portion and the third body portion. The second body portion defines an offset with respect to the first body portion. In addition, the third body portion defines a second surface above the finger switch, which is adapted to receive at least the person's index finger.

It is contemplated that the finger switch is configured to be actuated by movement in lateral directions with respect to a front surface of the second body portion.

In one contemplated embodiment, the finger switch is a toggle switch.

Where the finger switch is a toggle switch, toggle of the finger switch in a first lateral direction actuates an intercom function and toggle of the finger switch in a second lateral direction actuates a radio transmit function.

In another contemplated embodiment, the finger switch is a slide switch.

If the finger switch is a slide switch, slide of the finger switch in a first lateral direction actuates an intercom function and slide of the finger switch in a second lateral direction actuates a radio transmit function.

In one contemplated embodiment, the offset of the second body with respect to the first body portion is at least axial.

In a further embodiment, the offset of the second body portion with respect to the first body portion is at least radial.

Further still, the offset may be both radial and axial.

In one contemplated embodiment, the controller may include a base to which the first body portion connects. In this embodiment, the base may be an essentially annular structure that flares outwardly from the first body portion.

The controller of the present invention also may include at least one thumb switch disposed on the third body portion.

When included, the thumb switch might be trim switch.

In one embodiment, the trim switch is contemplated to include two toggle switches, disposed side-by-side, that permit control of the trim of the aircraft.

In another contemplated embodiment, the at least one thumb switch may be an autopilot release switch. The autopilot release switch may be a push button. The autopilot release switch also might actuate an autopilot priority function.

It is contemplated that the controller of the present invention may be adapted for use on an aircraft that is controlled by a fly-by-wire system that provides resistive feedback to the controller.

If so, it is contemplated that the resistive feedback may increase proportionately with a magnitude of an angular displacement of the controller from a rest position. For example, the resistive feedback provided to the controller, when the controller is displaced from a rest position, might exceed about 20 pounds (89 Newtons) of force at a maximum. Alternatively, the resistive feedback may be about 40 pounds (178 Newtons) of force at a maximum.

It is contemplated that the controller of the present invention will be adapted to be mounted so that an axis of the controller may be moved angularly in any of 360° as measured from a rest position of the controller.

Moreover, it is contemplated that the finger switch, being a lateral switch, discourages actuation when the controller is pulled by the person in a rearward direction from a rest position.

The controller is contemplated for use in an aircraft cockpit.

The controller may be positioned within the aircraft cockpit as a central controller.

Alternatively, the controller may be positioned within the aircraft cockpit as a sidestick controller.

Other aspects of the present invention will become apparent from the discussion provided herein and from the drawings appended hereto.

BRIEF DESCRIPTION OF THE DRAWINGS

The present invention will now be described in connection with the drawings appended hereto, in which:

FIG. 9 is a perspective, front view of the controller of the present invention, illustrating an alternative contemplated grip that a person may apply to the controller.

DETAILED DESCRIPTION OF EMBODIMENTS OF THE INVENTION

Figure 1:
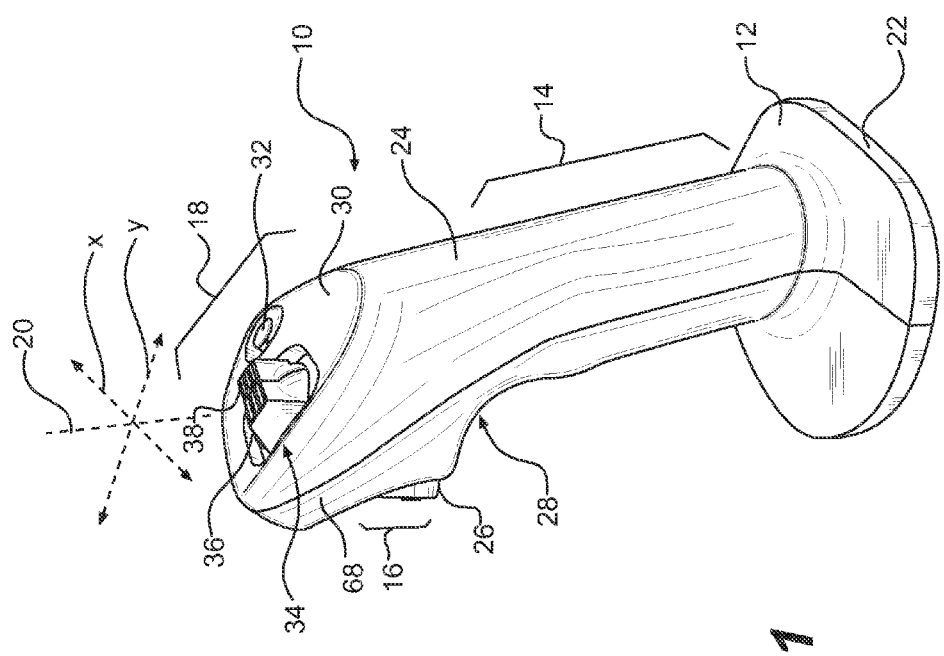
FIG. 1 is a perspective illustration of one contemplated embodiment of the controller of the present invention.

The present invention will now be described in connection with one or more embodiments thereof. The discussion of any one particular embodiment should not be understood to be limiting of the present invention. To the contrary, the embodiments discussed are intended to be illustrative of the breadth and scope of the present invention. Moreover, those skilled in the art should appreciate that there are variations and equivalents to the embodiments described herein. Those variations and equivalents are intended to be encompassed by the present invention.

The present invention is intended for use on aircraft that employ or incorporate a fly-by-wire operational system. More specifically, the controller of the present invention is intended to be used as the sidestick in a fly-by-wire aircraft. While the controller of the present invention is described in this context, the present invention is not intended to be limited solely to this environment. To the contrary, as should be apparent to those skilled in the art, there are numerous alternative vehicles and positions where the controller of the present invention may be employed. For example, the controller may be employed as a center stick in an aircraft, as a controller for a tracked vehicle, as a controller for a train (or mass transit vehicle), among others. The sheer number of possible applications makes assembly of a comprehensive list difficult.

In the drawings appended hereto, it is noted that the controller of the present invention defines a surface area that compliments the human hand, whether it is the right or left hand. Discussion or illustration of specific aspects of the controller of the present invention, therefore, is not intended to ascribe any utilitarian functionality to specific surfaces or features that make up the present invention. It is contemplated, therefore, that aspects of the controller of the present invention may protected separately via one or more design patent applications.

The controller 10 is depicted generally in FIG. 1. The controller includes a base 12, a first body portion 14, and second body portion 16, and a third body portion 18. Together, these four portions form the body of the controller 10.

It is noted that FIGS. 1-6 illustrate a controller that is intended to be positioned on the pilot side (i.e., the starboard side or left side) of the aircraft. If the controller is moved to the co-pilot side (i.e., the port side or the right side) of the aircraft, the controller is expected to appear as a mirror image of the controller illustrated in FIGS. 1-6. Since the controller is asymmetric and is designed to interface with a person's hand, different controllers are anticipated to be positioned on either side of the aircraft.

The controller 10 is intended to be mounted on a surface such that a central axis 20 of the controller may be moved in any direction orthogonal thereto. X and Y directions are indicated in FIG. 1 for clarity.

The base 12 is illustrated as a flared flange that extends downwardly and outwardly from the first body portion 14 to a boundary wall 22.

The first body portion 14 is adapted to be gripped by a person's hand. Specifically, the first body portion 14 is intended to accommodate the person's middle finger, ring finger, and pinky finger. With this orientation, the palm of the person's hand will rest against the rear surface 24 of the first body portion 14 while the bottoms of the person's fingers will rest against the front surface 28 of the first body portion 14 and the second body portion 16.

The second body portion 16 of the controller 10 includes a finger switch 26, which is positioned on a front surface 28 of the controller 10.

The third body portion 18 of the controller 10 defines essentially a bulbous top end of the controller 10. The third body portion 18 includes a top surface 30 that is intended to accommodate a person's thumb.

In the illustrated embodiment, the top surface 30 includes two switches. The first switch is an autopilot release switch 32. The second switch is the trim switch 34, which includes two toggle switches 36, 38, that are disposed side-by-side. The two toggle switches 36, 38 are operated in tandem to control the trim of the aircraft.

The switches 32, 34 are positioned on the top surface 30 of the third body portion 18 such that the switches 32, 34 are easily accessed and activated by the person's thumb.

With respect to the trim switches 36, 38, it should be understood that pushing down on the toggle switches 36, 38 reduces the trim of the aircraft. Alternatively, pushing forward on the switches 36, 38 increases the trim of the aircraft.

It is noted that the autopilot release switch 32 is illustrated as a push button. Specifically, by pushing the button 32, the autopilot is released. In addition, the autopilot release switch 32 may act as a priority switch. When the priority switch 32 is depressed, this indicates to the flight computer that the controller 10 is the dominant controller. Therefore, if conflicting inputs are provided by the two controllers in the cockpit, the input provided by the priority controller will govern the aircraft, thereby avoiding any conflict in flight instructions.

The trim switch 34 combines two toggle switches 36, 38, which are disposed in a side-by-side arrangement. When pressure is applied to the toggle switches to pull them toward the rear surface 24 of the controller 10, the trim for the aircraft is reduced. When the toggle switches 36, 38 are pushed toward the front surface 28 of the controller 10, the trim for the aircraft is increased. As should be understood, both toggle switches 36, 38 must be manipulated together (or in tandem) for the trim of the aircraft to be altered.

While the autopilot release switch 32 and the trim switch 34 are provided on the top surface 30 of the controller illustrated in FIGS. 1-6, it is noted that one or both of the switches 32, 34 may be excluded without departing from the scope of the present invention. Alternatively, the top surface 30 may include a larger or smaller number of switches, as required or as desired.

Figure 2:
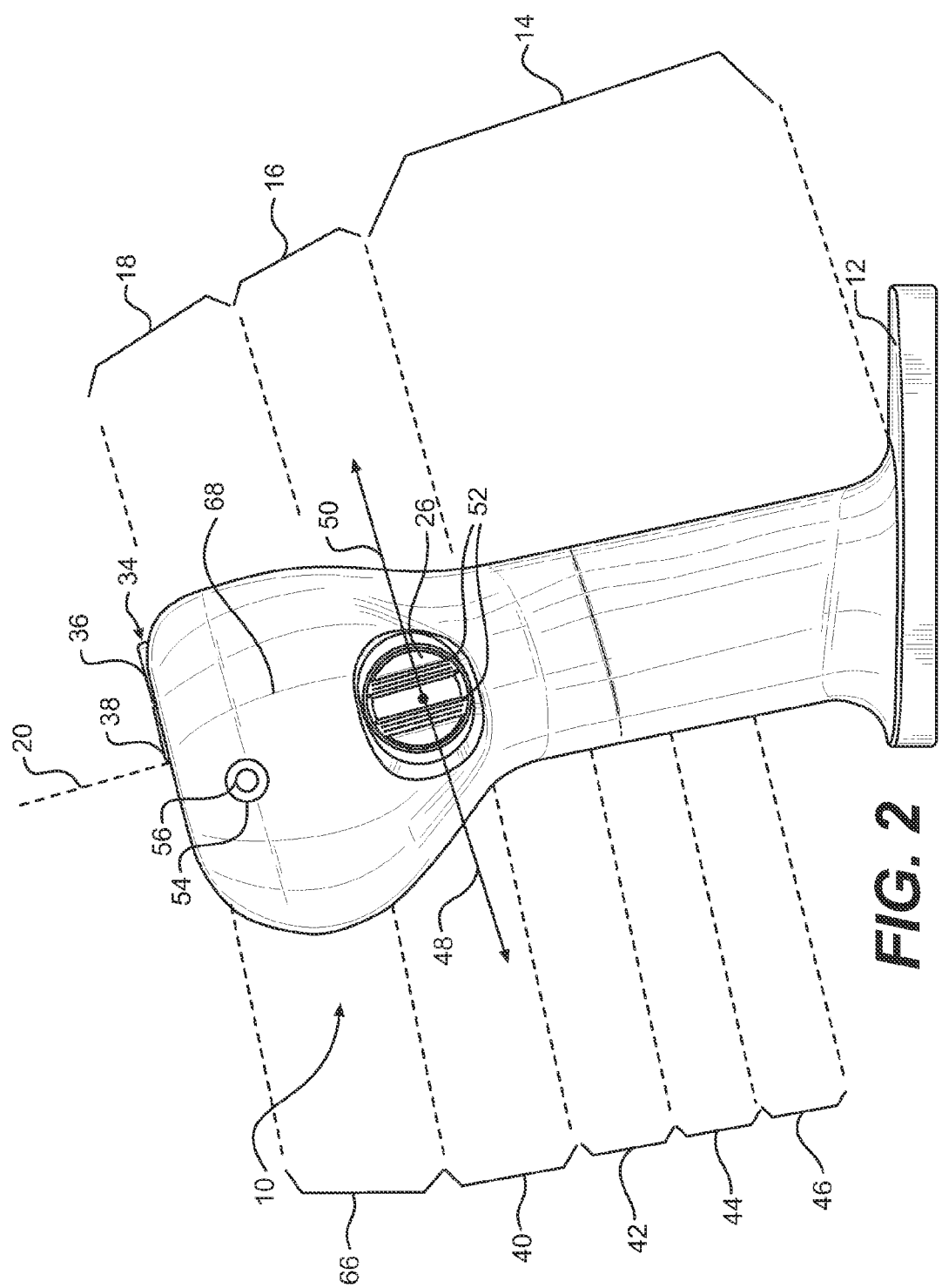
FIG. 2 is a front side view of the controller of the present invention.

With reference to FIG. 2, the controller 10 is shown from a front view, which clearly highlights the position of the finger switch 26.

In one embodiment, the finger switch 26 is contemplated to be a toggle switch. As such, the finger switch may be moved in both a first lateral direction 48 and a second lateral direction 50. When moved in the first lateral direction 48, the switch 26 actuates an intercom function. When the switch 26 is moved in the second lateral direction 50, the switch 26 actuates a radio transmit function. As understood by those skilled in the art, the intercom function permits the pilot to communicate with persons, such as members of the flight crew, within the aircraft. When the radio transmit function is activated, the pilot is able to engage in conversation on the radio frequency (or communication channel) is currently active. This permits the pilot to speak with an air traffic controller or pilots of other aircraft, for example.

As also illustrated, the finger switch 26 includes two ridges 52 on its surface to assist with toggling the switch 26 in the lateral directions 48, 50. The ridges 52 enhance frictional engagement with the person's index finger to assist with activation of the finger switch 26 in one of the two possible activation modes.

It is noted that the switch 26 may permit the activation of only one function or more than two functions without departing from the scope of the present invention.

In an alternative contemplated embodiment, the finger switch 26 is not a toggle switch. Instead, the finger switch 26 is a slide switch that slides in the directions 48, 50 illustrated. In this embodiment, when the switch 26 is slid in a first direction 48, the intercom is activated. As in the prior embodiment, when the switch 26 is slid in the second direction 50, radio communication is made available to the pilot (or co-pilot).

While a toggle switch and a slide switch are contemplated as two possible variants of the present invention, other types of switches may be employed without departing from the scope of the present invention.

As illustrated in FIG. 2, the first body portion 14 and the second body portion 16 define four separate regions, each of which correspond to the fingers on a person's hand. As shown, the second body portion 16 defines essentially an index finger region 40 on the controller 10. The first body portion 14 defines a middle finger region 42, a ring finger region 44, and a pinky finger region 46. The third body portion 18 essentially defines a bulbous top end to the controller 10. The third body portion 18 also defines the top surface 30 that accommodates the person's thumb thereon. The top surface 30, therefore, also may be referred to as a thumb region 30. The top surface 30 also may be a region that accommodates the person's index finger, as many different grasping positions are possible with the controller 10 of the present invention.

As also illustrated, the third body portion 18 of the controller 10 also defines a finger region 66 on a front surface 68. The finger region 66 is provided in a position above the finger switch 26. The finger region 66 on the front surface 68 provides a location where the pilot may position his or her index finger (or other fingers) when grasping the controller 10 and pulling on the controller in the rearward direction 58.

FIG. 2 illustrates one further aspect of the controller 10. Specifically, it is contemplated that the shell (or exterior surface) of the controller 10 will be fabricated from two pieces that are held together to one another via a suitable fastener, such as a screw. FIG. 2 illustrates a hole 54 that receives a fastener 56 therein. The fastener 56 holds the halves of the controller 10 together.

Figure 3:
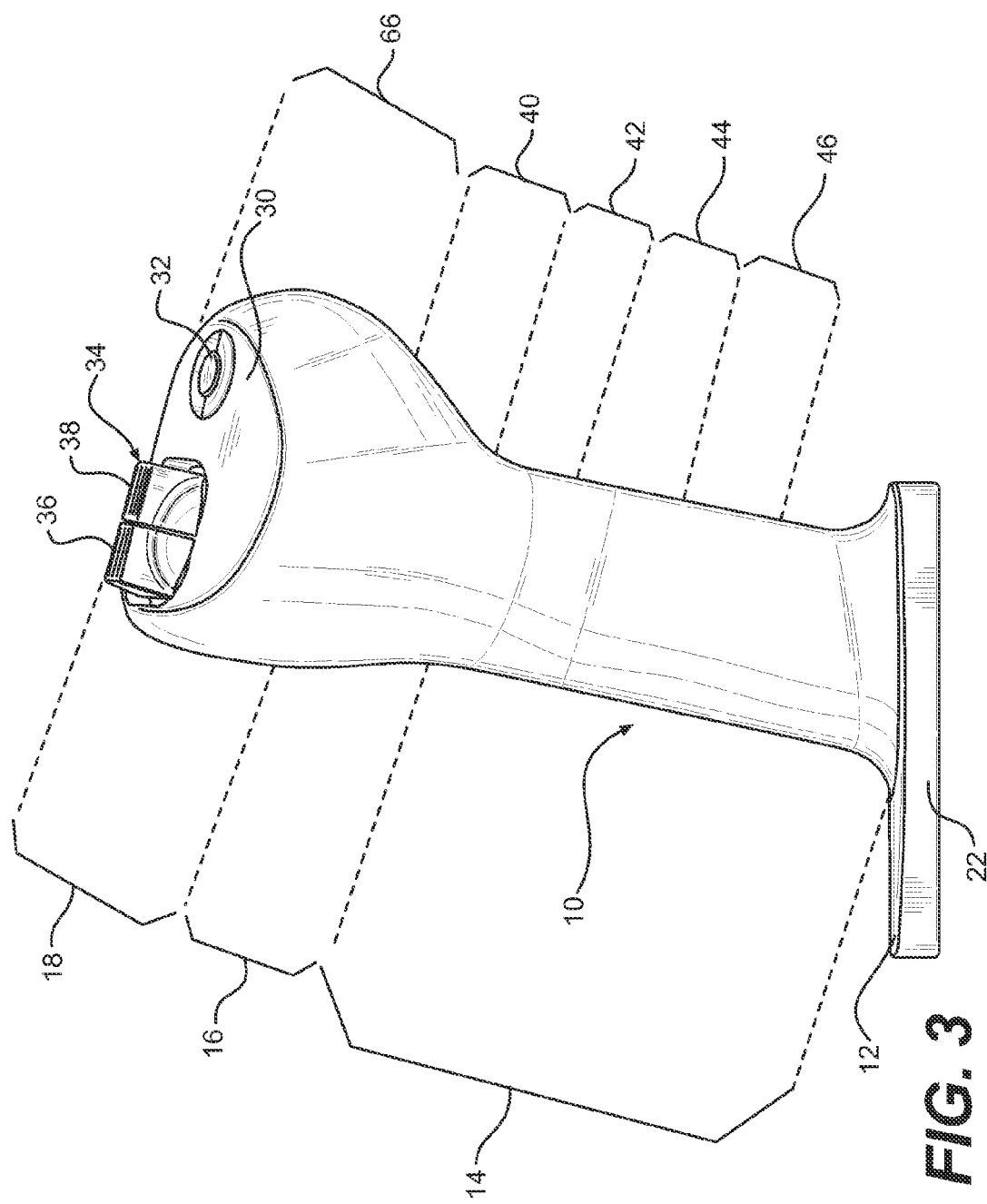
FIG. 3 is a rear view of the controller of the present invention.

FIG. 3 is a rear view of the controller 10 of the present invention. The switches 32, 34 are more easily identified in this illustration.

Figure 4:
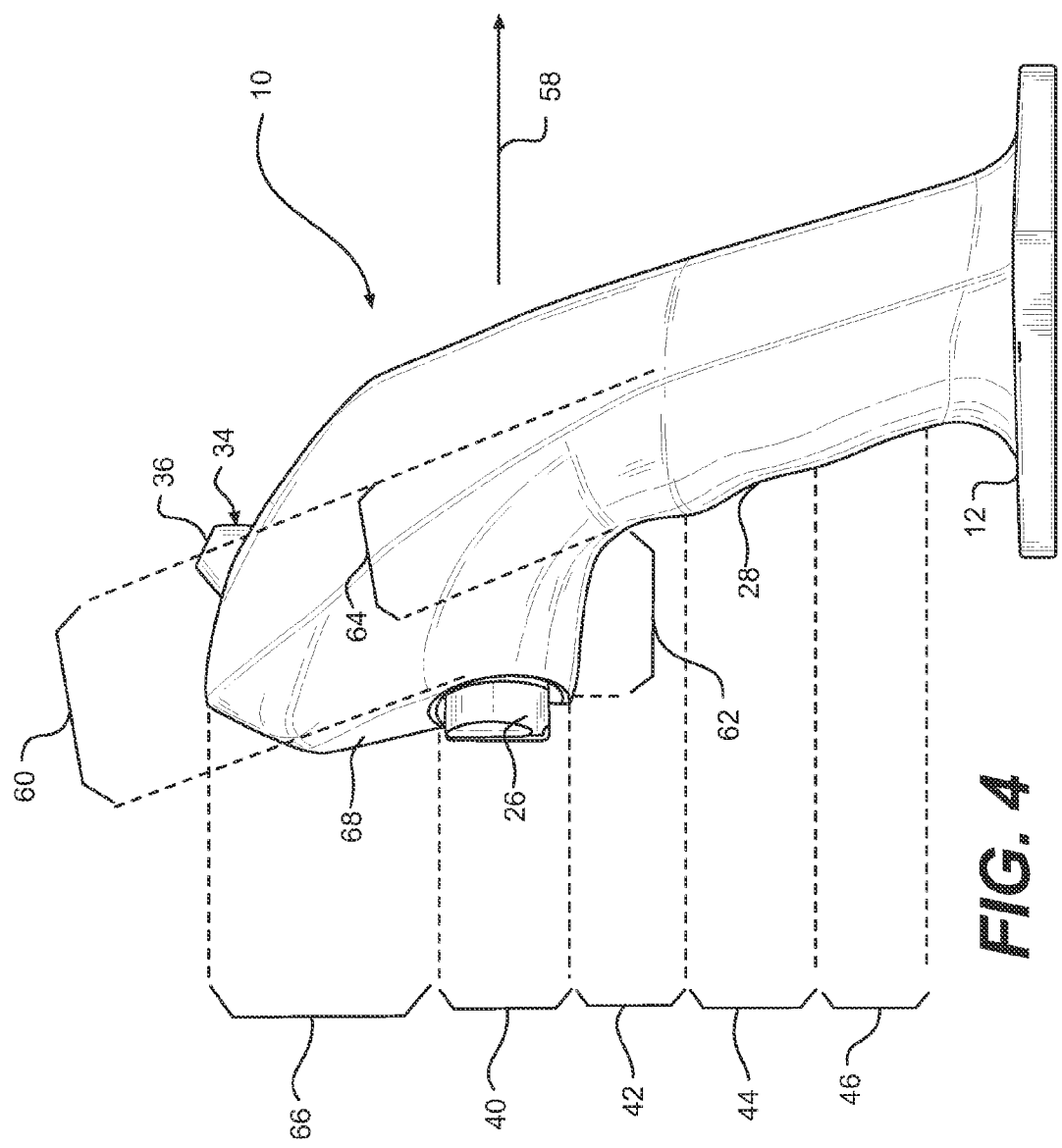
FIG. 4 is a left side view of the controller of the present invention.
Figure 5:
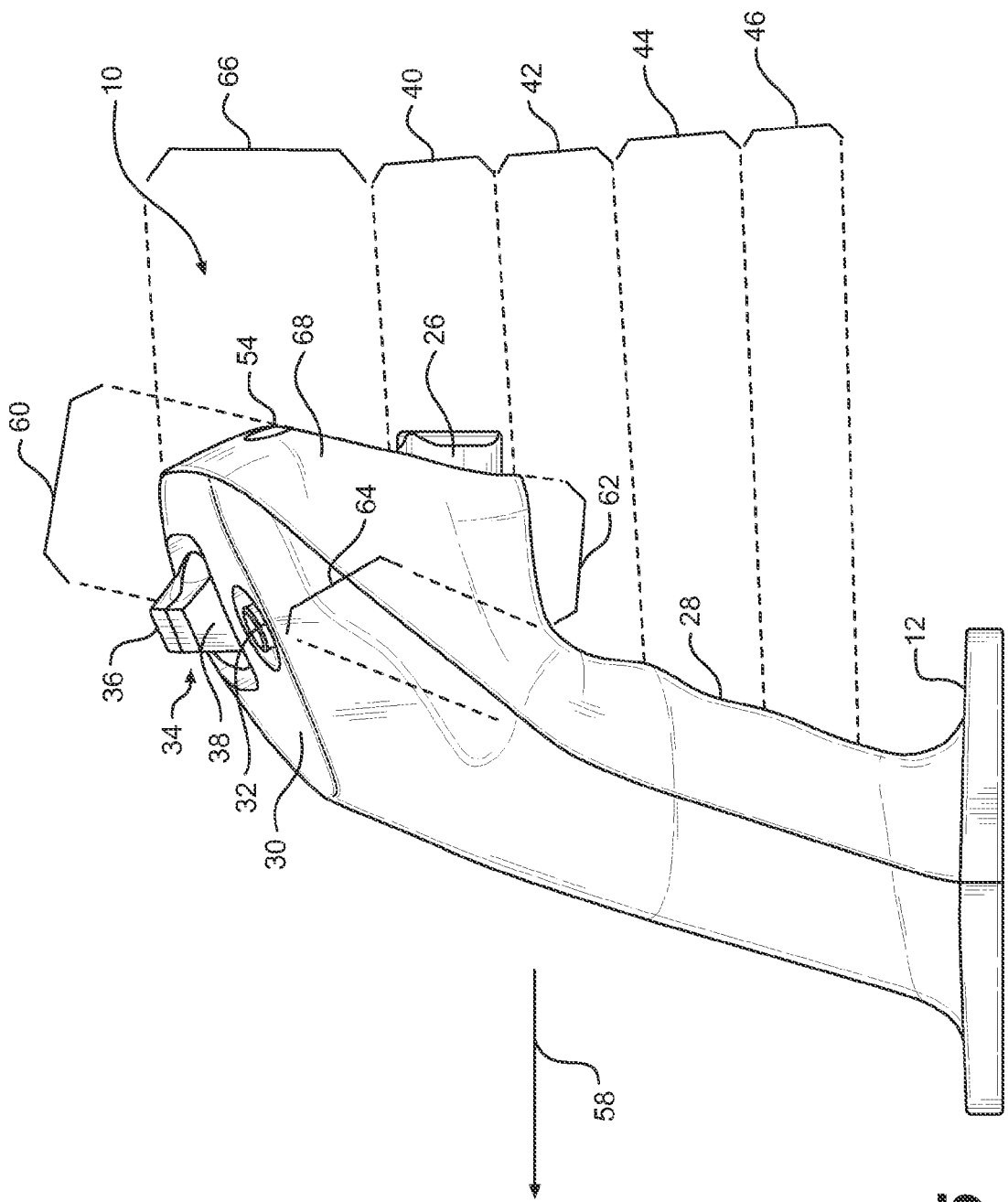
FIG. 5 is a right side view of the controller of the present invention.
Figure 6:
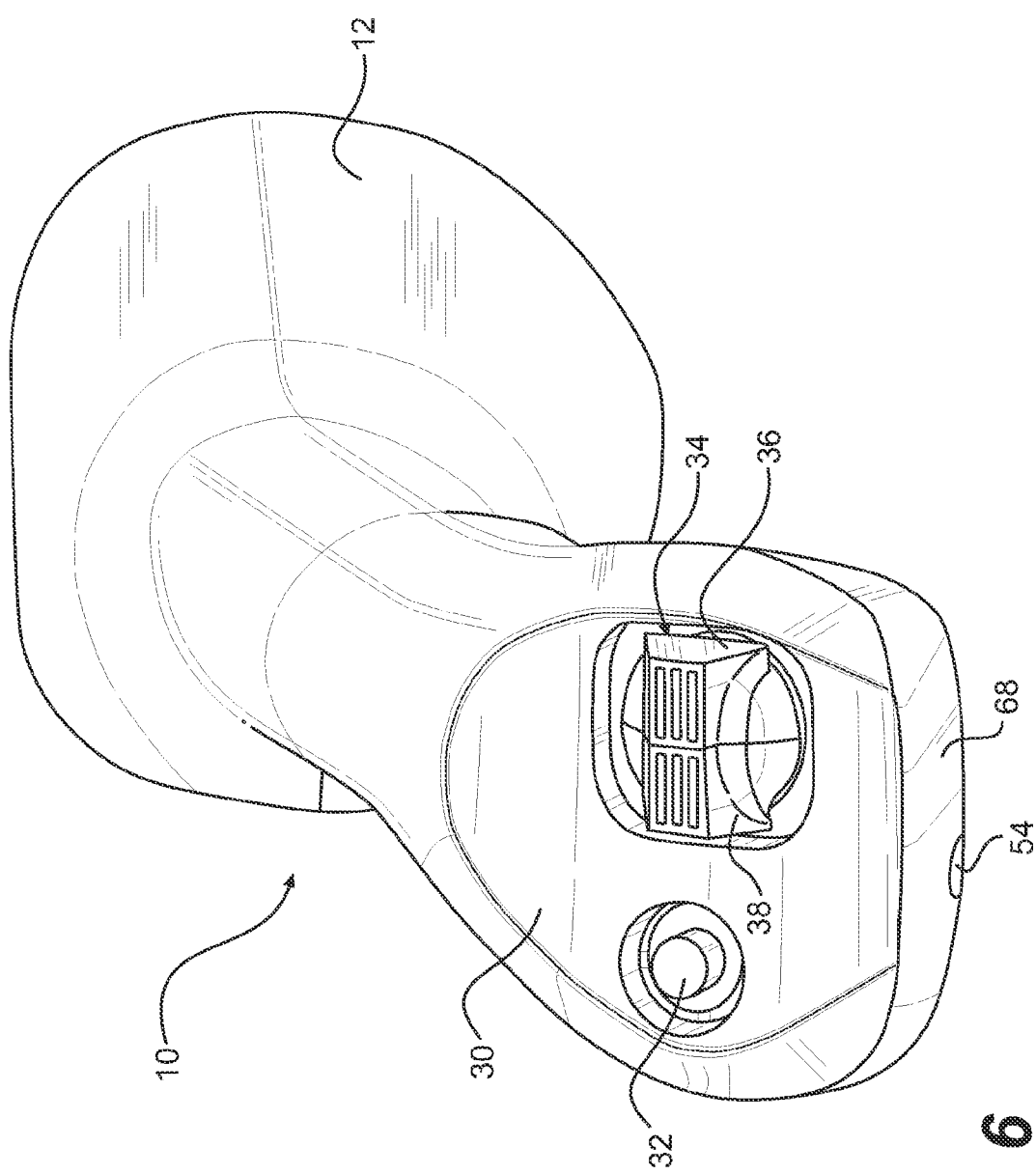
FIG. 6 is a top view of the controller of the present invention.
Figure 7:
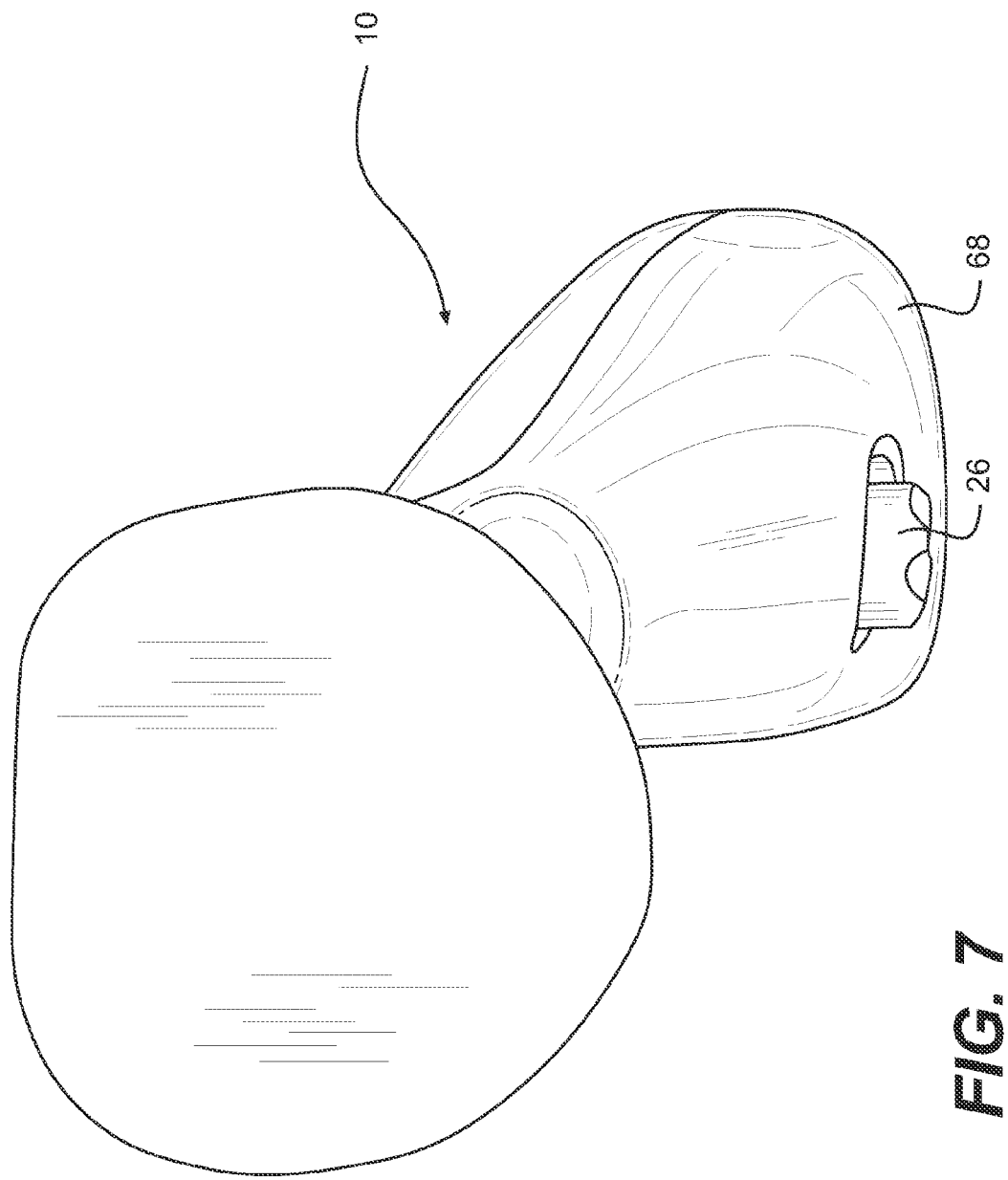
FIG. 7 is a bottom view of the controller of the present invention.

FIG. 4 is a left side view of the controller 10. FIG. 5 is a right side view of the controller 10.

FIGS. 4 and 5 illustrate at least one further aspect of the present invention. In these views, the rearward pull direction of the controller 10 is indicated by reference numeral 58. The rearward pull direction 58 is the direction in which a pilot and/or co-pilot would direct the controller, if the pilot and/or co-pilot were interested in causing the aircraft to tilt its nose upwardly, thereby flying higher into the Earth's atmosphere.

With the finger switch 26 positioned on the front surface 28 of the controller 10, it is possible that the person operating the controller 10 might actuate the switch 26 inadvertently. Specifically, if the finger switch 26 were a push button switch, any pressure applied to pull the controller 10 in the rearward direction 58 also might cause a person to activate the switch 26. It is for this reason, among others, that the switch 26 is designed to be activated via lateral movement in the first and second directions 48, 50.

In addition, it is contemplated that the controller 10 will be mounted in an aircraft in a manner that provides resistive feedback to the person operating the controller. Resistive feedback refers to the operation of the controller 10 whereby a person needs to apply increasingly greater amounts of force to the controller 10 as the controller 10 is pushed to its operational limits. As should be apparent, in a fly-by-wire aircraft, resistive force is not required: the computer simply measures the angle of deflection of the controller 10 from the rest position and translates this angle into an input for the flight control of the aircraft.

It has been proposed, however, that providing a controller 10 with resistive feedback provides the user with a heightened sense of the location of the controller 10 in its displacement from the rest position. As a result, resistive feedback may be provided to enhance the "feeling" of control associated with the controller 10. Where resistive feedback is employed, it is contemplated that the resistive feedback provided to the controller 10, when the controller 10 is displaced from a rest position, will exceed about 20 pounds (89 Newtons) of force at a maximum. It is also contemplated that the resistive feedback will be is about 40 pounds (178 Newtons) of force at a maximum. Other magnitudes for the resistive feedback also are contemplated.

As should be apparent, when the controller 10 is subjected to resistive feedback, a greater amount of force is needed to pull the controller 10 in the rearward direction 58. As such, there is an increased likelihood that a user might activate the switch 26 during pullback of the controller in the rearward direction 58. It is also for this reason that the finger switch 26 is designed to be laterally operated, as discussed above.

FIGS. 4 and 5 also illustrate that the position of the finger switch 26 is offset radially from the central axis 20 of the controller 10. Specifically, the finger switch is radially offset from the central axis by a distance 60. As such, the finger switch 26 is radially offset by a distance 62 from a surface defined by the first body portion 14. For reference, the average distance from the front surface 28 of the first body portion 14 to the central axis is labeled as 64. It is also noted that the second body portion 16 is displaced axially from the first body portion 14. As a result, the second body portion 16 is both axially and radially offset from the first body portion 14. This axial and radial offset assists with the positioning of the finger switch 26.

It has been found that an offset of the finger switch 26 provides a better "feel" for the controller 10. It is for this reason, among others, that the finger switch 26 is not mounted into a surface that is a continuation of the front surface 28 of the first body portion 14 of the controller.

As should be apparent from the foregoing discussion, the first body portion 14 is configured to receive a person's index finger in the index finger region 40, a person's middle finger in the middle finger region 42, and a person's pinky finger in the pinky finger region 44. While this is the intended configuration of the controller 10 of the present invention, it is understood that the person could wrap all four fingers around the first body portion 14, leaving the finger switch 26 uncovered. Alternatively, it is contemplated that a person could place his or her index finger and middle finger over the finger switch 26, leaving the person's ring finger and pinky finger to wrap around the first body portion 14. Still other configurations are contemplated.

While a person may opt to use the controller 10 in a manner that deviates from the intended use, the controller 10 of the present invention is defined such that the first body portion 14 is adapted to receive the person's middle finger, ring finger, and pinky finger. The second body portion 16 is adapted to receive the person's index finger, and the third body portion 18 is adapted to receive the person's thumb. The definitions of these aspects of the present invention are provided merely to convey the breadth and scope of the controller 10 of the present invention. The use of specific conventions to define the controller 10, however, should not be understood to be limiting of the present invention. The controller 10 may be used in a manner inconsistent with the intended use but still conform to the design of the controller 10 of the present invention.

Figure 8:
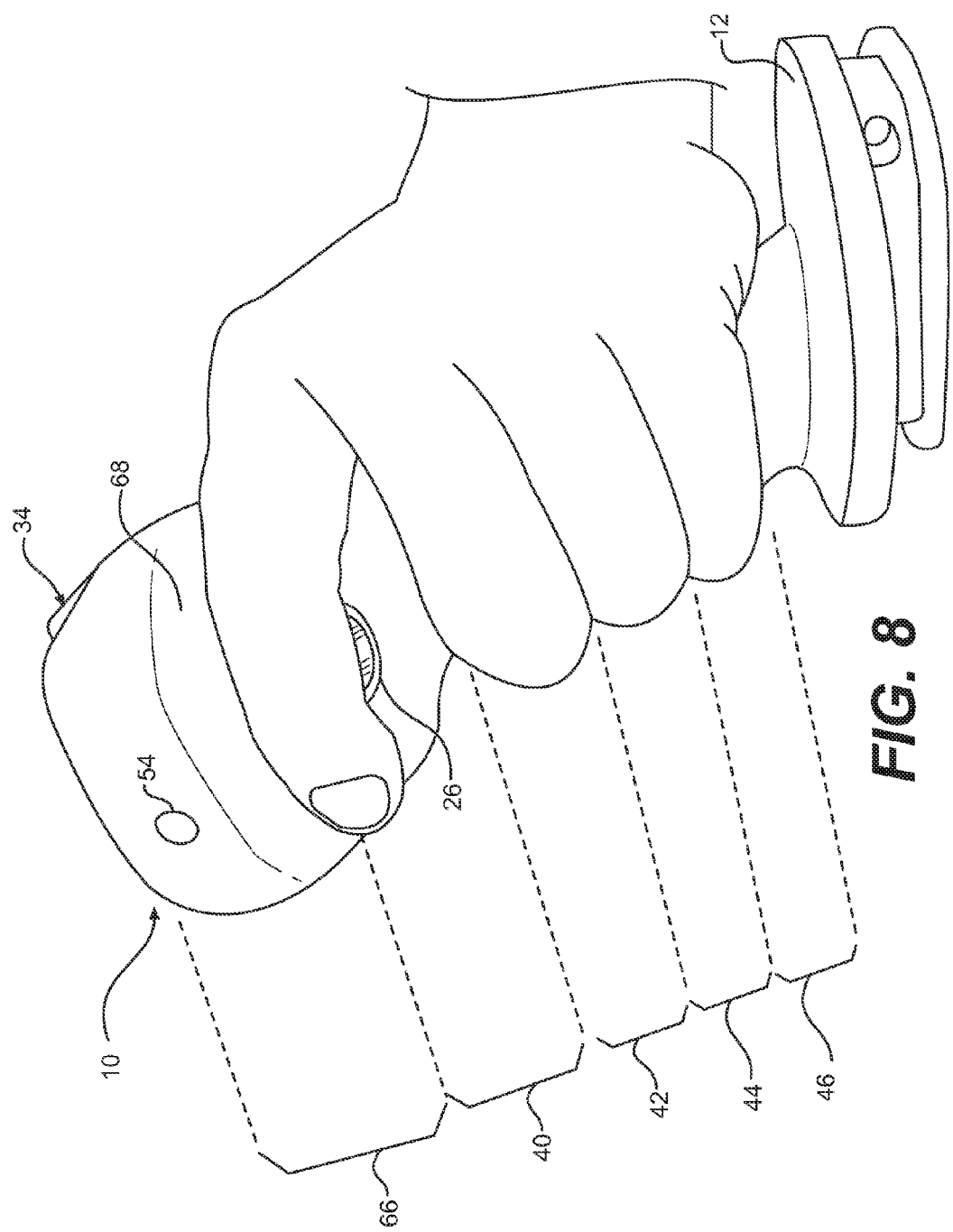
FIG. 8 is a perspective, front view of the controller of the present invention, illustrating one contemplated grip that a person may apply to the controller.

FIGS. 8 and 9 are provided to illustrate how the controller 10 might be used in actual practice. Both of these views are perspective, front views.

In FIG. 8, the controller 10 is being grasped in a manner consistent with the design parameters that underlie the various aspects of the present invention. As discussed above, when the person grasps the controller 10 in this first manner, the first body portion 14 is grasped by the person's middle finger, ring finger, and pinky finger. In addition, the second body portion 16 receives the person's index finger over the finger switch 26.

In FIG. 9, the controller is being grasped in a second manner that differs from the first manner. Here, the first body portion 14 is being grasped by the person's ring finger and pinky finger. The second body portion 16 is being grasped by the person's middle finger, such that the person's middle finger overlies the finger switch 26. In this grasping position, the person's index finger wraps around the third body portion 18 such that the person's index finger lies in the finger region 66, in contact with the front surface 68. It is contemplated that this second grasping position may be employed when the pilot or copilot desires to apply a greater pull in the rearward direction 58, which occurs when the pilot or copilot desires to establish an upward pitch for the aircraft, for example. It is contemplated that this second grasping position will provide the pilot with a better ability to apply a rearward force on the controller 10, especially in circumstances where the controller 10 operates with resistive feedback.

As noted above, the present invention is described in connection with one or more embodiments. The embodiments described are intended to be exemplary of the numerous variations and equivalents that also are encompassed herein. The discussion of any one embodiment, use, functionality, etc., should not be understood to be limiting of the present invention. The present invention is intended to encompass any equivalents and variations that would be apparent to those skilled in the art.

What is claimed is:

1. An aircraft controller, comprising:
   a first body portion, adapted to be grasped by a person's middle finger, ring finger, and pinky finger;
   a second body portion adapted to be grasped by a person's index finger; and
   a third body portion defining a first surface adapted to receive a person's thumb; and
   a finger switch positioned on a front surface of the second body portion, wherein the finger switch is positioned so as to be actuated by the person's index finger;
   wherein the second body portion is disposed between the first body portion and the third body portion,
   wherein the second body portion defines an offset with respect to the first body portion, wherein the third body portion defines a second surface above the finger switch, which is adapted to receive at least the person's index finger,
   wherein the finger switch is configured to be actuated by movement in lateral directions with respect to a central axis of the controller,
   wherein actuation of the finger switch in a first lateral direction actuates a radio transmit function, and
   wherein actuation of the finger switch in a second lateral direction actuates an intercom function.

2. The aircraft controller of claim 1, wherein the finger switch is at least one selected from a group comprising a toggle switch and a slide switch.

3. The aircraft controller of claim 1, wherein the offset is selected from a group comprising at least axial, at least radial, and both axial and radial.

4. The aircraft controller of claim 1, further comprising a base to which the first body portion connects, wherein the base comprises an essentially annular structure that flares outwardly from the first body portion.

5. The aircraft controller of claim 1, further comprising at least one thumb switch disposed on the third body portion.

6. The aircraft controller of claim 5, wherein the at least one thumb switch comprises a trim switch.

7. The aircraft controller of claim 6, wherein the trim switch comprises two toggle switches, disposed side-by-side, that permit control of a trim of an aircraft.

8. The aircraft controller of claim 5, wherein the at least one thumb switch comprises a push button autopilot release switch that actuates an autopilot priority function.

9. The aircraft controller of claim 1, wherein the controller is adapted for use on an aircraft that is controlled by a fly-by-wire system that provides resistive feedback to the controller.

10. The aircraft controller of claim 9, wherein the resistive feedback increases proportionately with a magnitude of an angular displacement of the controller from a rest position.

11. The aircraft controller of claim 9, wherein the resistive feedback provided to the controller, when the controller is displaced from a rest position, exceeds about 20 pounds (89 Newtons) of force at a maximum.

12. The aircraft controller of claim 11, wherein the resistive feedback is about 40 pounds (178 Newtons) of force at a maximum.

13. The aircraft controller of claim 1, wherein the finger switch, being a lateral switch, discourages actuation when the controller is pulled by the person in a rearward direction from a rest position.

14. The aircraft controller of claim 1, wherein the second surface on the third body portion permits the person to apply pressure thereto in a rearward direction by positioning at least the person's index finger there against.

* * * * *